United States Patent Office 2,926,167
Patented Feb. 23, 1960

2,926,167
PROCESS OF ESTERIFYING 18-HYDROXY YOHIMBANES

Robert Joly, Montmorency, Robert Bucourt, Villiers-le-Bel, and Edmond Toromanoff, Paris, France, assignors to Les Laboratoires Francais de Chimiotherapie, Paris, France, a corporation of France No Drawing. Application April 11, 1958
Serial No. 727,782

Claims priority, application France July 25, 1957
6 Claims. (Cl. 260—287)

The present invention relates to a process of producing compounds valuable in the synthesis of compounds of the reserpine series.

It is known that most of the effective compounds of the reserpine series are esters of the 18β-hydroxyl group of the reserpine molecule. For instance, deserpidine and reserpine are the 18β-(3′,4′,5′-trimethoxy) benzoates of the methyl ester of deserpidic acid and, respectively, of reserpic acid and rescinnamine is the 18β-(3′,4′,5′-trimethoxy) cinnamate of the methyl ester of reserpic acid. Furthermore, the technical literature mentions other esters, particularly esters of aliphatic, aryl substituted aliphatic, aromatic, heterocyclic, and the like acids with the methyl ester of deserpidic or reserpic acid. Such esters are of considerable interest with respect to their physiological activity.

In order to produce such 18β-esters of the reserpine series, the methyl ester of deserpidic or of reserpic acid is reacted with an acid chloride in the presence of pyridine. According to another process an 18β-hydroxy-17α - methoxy-3-oxo-16β-methoxy-carboxyl-2,3-seco-20α-yohimbane compound which may be substituted in the positions 9, 10, 11, and 12, is esterified by means of an acid chloride, such as the 3,4,5-trimethoxy cinnamoyl chloride or the 3,4,5-trimethoxy benzoyl chloride, in the presence of pyridine. The resulting ester is converted to the corresponding 3,4-dehydro-compound of reserpine, deserpidine or rescinnamine which is then hydrogenated to the desired saturated 18β-ester of the reserpine series. In this process which is of particular interest in the total synthesis of effective Rauwolfia alkaloids, also esterification of the 18-hydroxyl group takes place.

The esterification methods described in the literature which use the corresponding acid chloride as esterifying agent in the presence of pyridine, generally achieve only moderate yields of about 70% of the theoretical amount. Furthermore, the final products must be subjected to a burdensome and complicated purification process by chromatographic absorption or recrystallization. No better results are obtained when using trimethoxy benzoic acid anhydride in the presence of pyridine in place of the corresponding acid chloride.

Therefore, it is one object of the present invention to provide a simple and more effective process of preparing 18-esters of compounds of the reserpine series.

Other objects of the present invention and advantageous features thereof will become apparent as the description proceeds.

In principle, the process according to the present invention consists in treating an 18-hydroxy compound of the reserpine series with the desired acid anhydride in the presence of pyridine and another tertiary base which is more basic than pyridine, such as triethylamine. The tertiary base has a very favorable influence on the reaction and results in an increase in yield to more than 80% and even to 90% of the theoretical amount.

When starting with the methyl ester of reserpic acid and subjecting said compound to the action of 3,4,5-trimethoxy benzoic acid anhydride in the presence of pyridine and triethylamine, reserpine is obtained in a yield of 92%. When using the heretofore unknown trimethoxy cinnamic acid anhydride in place of trimethoxy benzoic acid anhydride, rescinnamine is obtained in a yield of 90%. Likewise, deserpidine is prepared from the methyl ester of deserpidic acid and trimethoxy benzoic acid anhydride in the presence of pyridine and triethylamine in about the same yield. Best results are obtained when using mixtures of pyridine and triethylamine containing triethylamine in an amount of 25% to 70% of the volume of pyridine, but these proportions may be varied without considerably lowering the yields.

In order to carry out the process according to the present invention, it is of advantage to heat an 18-hydroxyl yohimbane compound with the desired acid anhydride in the presence of pyridine and triethylamine under pressure and in the absence of air at a temperature preferably between about 80° C. and about 100° C. and for a period of time generally between about 10 hours and about 24 hours. It is also possible to reflux the pyridine-triethylamine mixture by passing nitrogen through the reaction vessel whereby, however, additional triethylamine must be added from time to time to the reaction mixture in order to compensate for the amount of triethylamine carried away by the nitrogen. After cooling, the reaction mixture is diluted with pyridine. Water is added in order to hydrolyze the excess of acid anhydride to the corresponding triethylamine salt. Further addition of water precipitates the desired ester which is readily purified by recrystallization. In place of precipitating the reaction product directly by the addition of water, the reaction mixture may also be extracted by means of a solvent which is not miscible with water and the extract may then be purified according to known processes. The ester compound may also be precipitated together with the acid derived from excess anhydride, by the addition of a mineral acid. The organic acid is removed from the ester by washing the crude precipitate with a sodium bicarbonate solution.

The following examples serve to illustrate the present invention without, however, limiting the same thereto. More particularly, other acid anhydrides than those mentioned in the examples may be used, pyridine may be replaced by an alkyl pyridine, such as methyl ethyl pyridine, and the reaction temperature may be varied in accordance with the principles set forth herein and in the claims annexed hereto.

The melting points given in the examples are instantaneous melting points determined on the Maquenne block.

EXAMPLE 1

*Preparation of reserpine of the following Formula I*

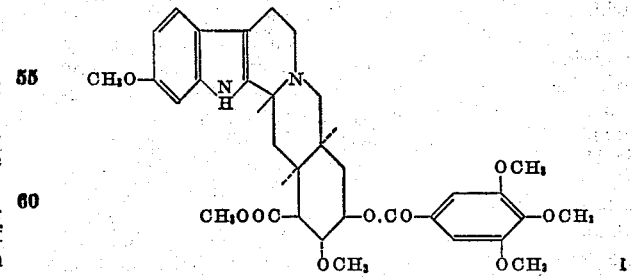

3.32 g. of the methyl ester of reserpic acid (melting point: 255° C.), 5 g. of recrystallized 3,4,5-trimethoxy benzoic acid anhydride (melting point: 156° C.), 10 cc. of pure anhydrous pyridine, and 5 cc. of pure anhydrous triethylamine are heated in a sealed pressure resistant reaction tube at 95–98° C. for 14 hours. The reaction tube is evacuated previously or is filled with nitrogen in place of air. After cooling to 20° C., the mixture is poured into a reaction vessel equipped with a mechanical stirrer and is diluted therein with 60 cc. of pyridine while stirring. 70 cc. of distilled water are then added with stirring while maintaining the temperature of the mixture below 20° C. by cooling. After the water has been added, stirring is continued for 10 more minutes. The solution is then cooled to +5° C. Without interrupting the stirring, another 70 cc. of distilled water are added while keeping the temperature of the solution below +5° C. The solution becomes turbid and crystallization sets in on scratching. The mixture is allowed to crystallize for a few minutes. Again with stirring and while maintaining the temperature below +5° C., 300 cc. of water are added. The mixture is cooled to 0° C. and stirred for 12 hours. The resulting reserpine is filtered with suction and washed first with 400 cc. of dilute 0.5 N ammonia, thereby always maintaining the temperature below +5° C., and then with ice-water until the wash waters are neutral. Thereby, reserpine containing water of crystallization is obtained. On slowly heating said reserpine to 100° C. in a vacuum, 4.5 g. of pure reserpine are obtained. The compound is identical with the natural product described in the literature. The yield corresponds to 92% of the theoretical amount.

EXAMPLE 2

*Preparation of the rescinnamine of the following Formula II*

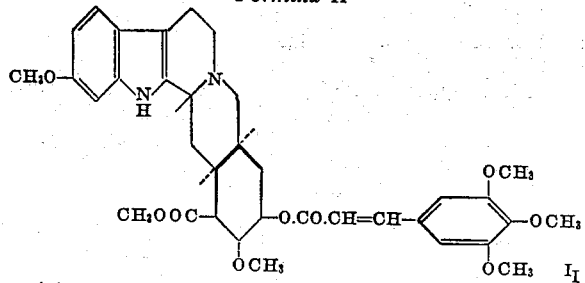

(a) *Preparation of 3,4,5-trimethoxy cinnamic acid anhydride.*—4.76 g. of 3,4,5-trimethoxy cinnamic acid are dissolved with stirring in 2.8 cc. of triethylamine and 20 cc. of technical grade acetone while passing nitrogen through the reaction vessel and keeping the mixture in the dark. Without discontinuing agitation, 1.92 g. of tosyl chloride are added to the clear yellow solution. Tosyl chloride dissolves immediately and a white precipitate is formed. The mixture is refluxed for half an hour and is then cooled. 5 drops of triethylamine are added so as to render the mixture alkaline. After the addition of ice and after stirring for 10 minutes, the resulting precipitate is filtered with suction, washed with ice-water and dried over phosphorus pentoxide. The yield is 3.98 g. of crude product (87% of the theoretical amount). The compound melts at 190–192° C. For purification, it is dissolved in 90 cc. of dichloro ethane with refluxing in the dark. The hot mixture is filtered and cooled whereby crystallization sets in. After the addition of 80 cc. of isopropyl ether and after cooling with ice for 30 minutes, the crystals are filtered with suction, washed with isopropyl ether, and dried in a vacuum and in the dark. The yield in said purification step is 81%. The pure compound melts at 196–197° C. It shows a yellow glint, is insoluble in ether and isopropyl ether, partly soluble in warm acetone, and soluble in 80 times its volume of hot benzene, 25 times its volume of hot dioxane, 70 times its volume of hot ethyl acetate, and 20 times its volume of dichloro ethane.

*Analysis.*—$C_{24}H_{26}O_9 = 458.4$. Calculated: 62.87% C; 5.72% H; 31.41% O. Found: 62.6% C; 5.7% H; 31.6% O.

The ultra-violet absorption spectrum in dioxane shows a maximum at 332 m$\mu$ with a molar extinction of $\epsilon = 31,800$.

This compound has not yet been described in the literature.

(b) *Preparation of rescinnamine.*—0.482 g. of methyl reserpate, 0.820 g. of trimethoxy cinnamic anhydride, prepared and purified as described under (a), 3 cc. of anhydrous pyridine, and 0.75 cc. of triethylamine are heated in a sealed evacuated pressure resistant reaction tube at 96° C. for 21 hours. After cooling to 20° C. in the dark, the tube is opened and the clear brown solution is diluted with 4.5 cc. of pyridine. 7.5 cc. of water are added drop by drop within about 15 minutes, thereby maintaining the temperature of the mixture below 20° C. After stirring at the same temperature for about 30 minutes so as to hydrolyze the excess trimethoxy cinnamic anhydride, the reaction mixture is cooled to about 0° C. 45 cc. of water are added within one hour, thereby keeping the temperature below +5° C. The precipitated rescinnamine is filtered with suction, washed with ice-water and triturated with isopropyl ether. The crystals are again filtered with suction, washed with isopropyl ether, and dried. 0.667 g. of crude rescinnamine (90.5% of the theoretical amount) are obtained as a fine pink powder. The compound is purified by suspending it in methanol and refluxing. After stirring at −5° C. for one hour, the crystals are filtered with suction, dried, and recrystallized from 10 parts by volume of hot butanol. After treating the solution with charcoal, while hot, and filtration, the solution is allowed to stand for crystallization. The resulting pure rescinnamine melts at 241° C. and has a specific rotatory power of $[\alpha]_D^{20} = -84° \pm 6°$ (concentration: 1% in chloroform). The ultra-violet absorption spectrum in ethanol shows the following values:

$\lambda_{max(1)} = 229$ m$\mu$ ($\epsilon = 54,900$)
$\lambda_{max(2)} = 304$ m$\mu$ ($\epsilon = 26,500$)
$\lambda_{min} = 258$ m$\mu$ ($\epsilon = 7,420$)

EXAMPLE 3

*Preparation of deserpidine of the following Formula III*

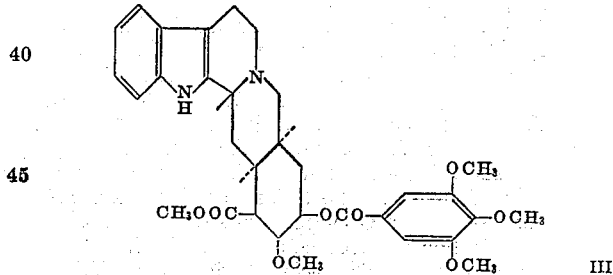

500 mg. of methyl deserpidate are esterified by reaction with 850 mg. of 3,4,5-trimethoxy benzoic anhydride in the presence of 2 cc. of anhydrous pyridine and 1 cc. of anhydrous triethylamine by heating said mixture at 80° C. for 16 hours in a sealed pressure resistant reaction tube in a nitrogen atmosphere. After cooling, 2 cc. of water are added. The mixture is allowed to stand for 30 minutes at 20° C. and is adjusted to a pH of 1.0 by the addition of hydrochloric acid. A precipitate is formed which is extracted by means of methylene chloride. The extract is washed successively with N hydrochloric acid, water, ammonia, and again with water, dried over magnesium sulfate, filtered, treated with charcoal, and evaporated to dryness in a vacuum. The residue is taken up with 10 cc. of methanol and 6 drops of 2,2 N nitric acid are added. The nitrate of deserpidine crystallizes. The crystals are filtered with suction and are mixed with acetone to form a paste. The salt is decomposed by adding a few drops of ammonia whereby the crystals dissolve. After filtration, water is added dropwise, the precipitated crystals are filtered with suction and are dried. Thereby, deserpidine is obtained in a yield of 80%. After recrystallization from acetone, the compound melts at 235° C. and has a specific rotatory power of $[\alpha]_D^{20} = -136°$ (concentration: 0.5% in chloroform). The compound is in all respects identical with natural deserpidine.

EXAMPLE 4

Preparation of 18β-(3',4',5'-trimethoxy benzoyloxy)-17α-methoxy-16β-methoxy carbonyl-3-oxo-2,3-seco-20α-yohimbane of the following Formula IV

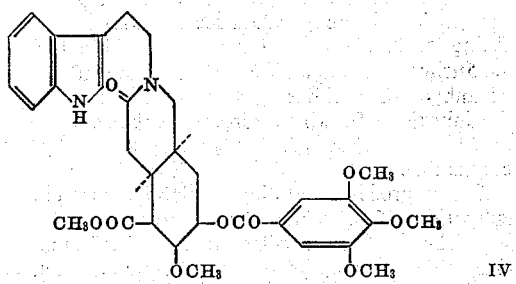

The mixture of 6 g. of 18β-hydroxy-17α-methoxy-16β-methoxy carbonyl-3-oxo-2,3-seco-20α-yohimbane, 9 g. of 3,4,5-trimethoxy benzoic acid anhydride, 36 cc. of anhydrous pyridine, and 24 cc. of anhydrous triethylamine is heated to 95° C. during 24 hours with stirring in a nitrogen atmosphere. The amount of triethylamine in the mixture is sufficient to maintain the required concentration therein until the reaction is completed. The pale yellow solution is cooled to 20° C. While stirring and keeping the temperature at about 20° C. by cooling, 36 cc. of water are added within a few minutes. Stirring is continued for 10 minutes at 20° C. The solution is then poured into a mixture of 300 g. of ice and 50 cc. of 22° Baumé hydrochloric acid while stirring and the pH-value of the solution is adjusted to a pH between 1.0 and 2.0 by the addition of hydrochloric acid. Thereby a solid compound is precipitated. The reaction mixture is extracted by means of 300 cc. of methylene chloride. After separation, the aqueous layer is again extracted by means of the same solvent. The extracts are combined, washed successively with 2 N hydrochloric acid, water, a saturated sodium bicarbonate solution, and, finally, with water until the wash waters are neutral. The organic solvent extract is dried over sodium sulfate, filtered, and evaporated to dryness in a vacuum. The residue is dissolved in 60 cc. of acetone. This solution is poured portion by portion on about 650 g. of ice while stirring. Stirring is continued for 30 minutes. The resulting colorless precipitate is filtered with suction, washed on the filter with ice-water, and dried in a vacuum. 8.33 g. (93.5% of the theoretical amount) of the desired compound of Formula IV are obtained. The compound has a melting point of 130° C. and a specific rotatory power of $[\alpha]_D^{20} = -40° \pm 1.5°$ (concentration: 1% in chloroform). The compound is readily converted into deserpidine by the action of phosphorus oxychloride and reduction of the resulting 3,4-dehydro-deserpidine.

EXAMPLE 5

Preparation of 18β-(3',4',5'-trimethoxy cinnamoyloxy)-11,17α-dimethoxy-16β-methoxy carbonyl-3-oxo-2,3-seco-20α-yohimbane of the following Formula V

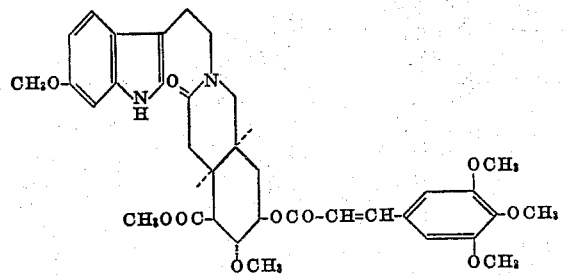

A mixture of 1.640 g. of trimethoxy cinnamic acid anhydride, prepared according to Example 2a, 1 g. of 18β-hydroxy-11,17α-dimethoxy-16β-methoxy carbonyl-3-oxo-2,3-seco-20α-yohimbane, 6 cc. of anhydrous pyridine, and 1.5 cc. of anhydrous triethylamine are reacted as described hereinabove in Example 1. After dilution with 9 cc. of pyridine and gradual addition of 15 cc. of water, the solution is poured into a mixture of 60 g. of ice and 20 cc. of hydrochloric acid (22° Baumé). The resulting fine suspension is filtered with suction. The filter cake is washed with water and again suspended in 20 cc. of a saturated aqueous solution of sodium bicarbonate which is cooled to 5° C. The suspension is filtered with suction and the filter cake is again treated with the sodium bicarbonate solution. After filtration and drying, the solid material is dissolved in 10 cc. of acetone. The solution is treated with charcoal and poured into a mixture of 100 cc. of water, 50 g. of ice, and 0.5 g. of sodium bircarbonate while stirring thoroughly and passing nitrogen through the reaction vessel. Thereafter, stirring is continued between 0° C. and 5° C. for one hour. The precipitated material is filtered with suction, washed with water, and dried in a vacuum. The yield of the final product, which is sufficiently pure for its conversion into rescinnamine, is 95% of the theoretical amount. The compound melts at 120° C.

EXAMPLE 6

Preparation of 18β-(3',4',5'-trimethoxy benzoyloxy)-11,17α-dimethoxy-16β-methoxy carbonyl-3-oxo-2,3-seco-20α-yohimbane of the following Formula VI

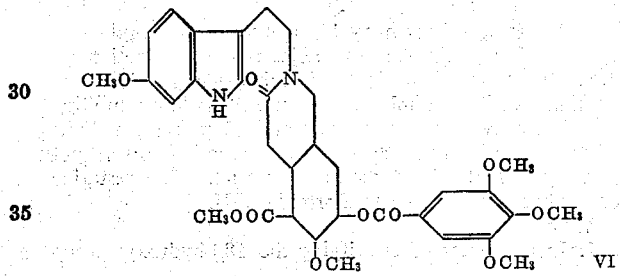

4 g. of 18β-hydroxy-11,17α-dimethoxy-16β-methoxycarbonyl-3-oxo-2,3-seco-20α-yohimbane, 5.8 g. of trimethoxy benzoic acid anhydride, 24 cc. of anhydrous pyridine, and 8 cc. of anhydrous triethylamine are heated in a sealed pressure resistant tube in a nitrogen atmosphere at 95° C. for 26 hours.

After dilution with 6 cc. of pyridine, excess anhydride is hydrolyzed by the addition of 30 cc. of water and allowing the mixture to stand at 20° C. The solution is then poured into a mixture of 120 g. of ice and 37.5 cc. of concentrated hydrochloric acid. The resulting mixture is extracted by means of methylene chloride. The extracts are treated as described hereinabove in Example 4. The dry residue obtained on evaporation of the methylene chloride is recrystallized as described in the preceding examples. After filtering, washing with water, and drying, 5.23 g. (90.2% of the theoretical amount) of the compound of Formula VI are obtained. Said compound melts at 126–129° C., has a specific rotatory power of $[\alpha]_D^{20} = -35° \pm 1.5°$. By subjecting said compound to the action of phosphorus oxychloride and hydrogenating the resulting 3,4-dehydroreserpine, reserpine is obtained.

EXAMPLE 7

Preparation of 10-chloro deserpidine of the following Formula VII

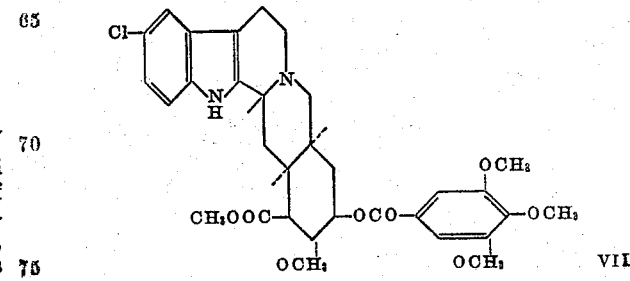

1.7 g. of the methyl ester of 10-chloro deserpidic acid is subjected to the action of 2.54 g. of 3,4,5-trimethoxy benzoic acid anhydride in the presence of 6 cc. of pyridine and 3 cc. of anhydrous triethylamine as described hereinabove in Example 1. 10-chloro deserpidine is obtained in a yield of 81% of the theoretical amount. The compound contians ½ mole of water of crystallization. It melts at 160–170° C.; $[\alpha]_D^{20} = -147° \pm 5°$ (concentration: 0.5%, in chloroform).

EXAMPLE 8

*Preparation of levorotatory 18β-(3',4',5'-trimethoxy benzoyloxy) - 11 - methoxy - 16β - methoxy carbonyl-17α-cyano-3β,20α-yohimbane of the following Formula VIII*

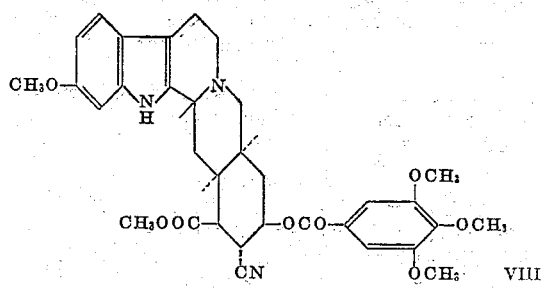

18β-hydroxy-11-methoxy-16β-methoxy carbonyl - 17α-cyano-3β,20α-yohimbane is subjected to the action of 3,4,5-trimethoxy benzoic acid anhydride as described hereinabove in Example 4. Because of its low solubility, 20 parts by volume of pyridine and 10 parts by volume of triethylamine have to be used as reaction solvent per part by weight of the starting material. The resulting compound corresponds to Formula VIII.

We claim:

1. In a process of esterifying the 18β-hydroxyl group of 18β - hydroxy - 16β - methoxy carbonyl - 20α - yohimbane compounds having a 17α substituent selected from the group consisting of methoxy and cyano groups, said 18β - hydroxy - 16β - methoxy carbonyl - 20α - yohimbane compounds being free of acylatable groups, with a carboxylic acid anhydride selected from the group consisting of 3,4,5 - trimethoxybenzoic acid anhydride and 3,4,5-trimehtoxycinnamic acid anhydride in the presence of anhydrous pyridine, under non-oxidizing conditions, the improvement which consists in replacing from 25% to 70% of the anhydrous pyridine with anhydrous triethylamine.

2. The process according to claim 1, wherein the acid anhydride is 3,4,5-trimethoxy benzoic acid anhydride.

3. The process according to claim 1, wherein the acid anhydride is 3,4,5-trimethoxy cinnamic acid anhydride.

4. The process according to claim 1, wherein the 20α-yohimbane compound used as starting material is the methyl ester of reserpic acid and the acid anhydride is 3,4,5-trimethoxy benzoic acid anhydride.

5. The process according to claim 1, wherein the 20α-yohimbane compound used as starting material is the methyl ester of deserpidic acid and the acid anhydride is 3,4,5-trimethoxy benzoic acid anhydride.

6. The process according to claim 1, wherein the 20α-yohimbane compound used as starting material is 18β-hydroxy-17α-methoxy-16β-methoxy carbonyl-3-oxo-2,3-seco-20α-yohimbane and the acid anhydride is 3,4,5-trimethoxy benzoic acid anhydride.

References Cited in the file of this patent

UNITED STATES PATENTS 2,824,874    Schlittler _____ Feb. 25, 1958

OTHER REFERENCES

Wagner: Synthetic Org. Chem., Wiley, N.Y. (1953), pp. 481 and 482.